Feb. 21, 1956 R. B. RICE ET AL 2,735,503
METHOD OF SEISMIC PROSPECTING
Filed Nov. 28, 1952 3 Sheets-Sheet 1

INVENTORS
R. B. RICE
S. D. ELLIOTT
BY Hudson & Young
ATTORNEYS

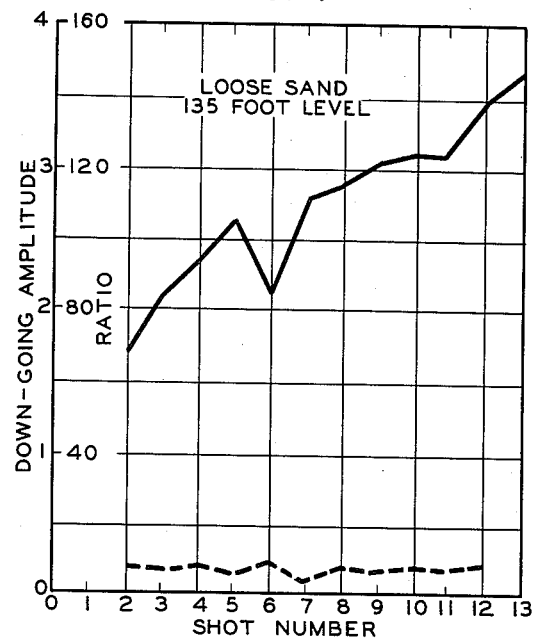
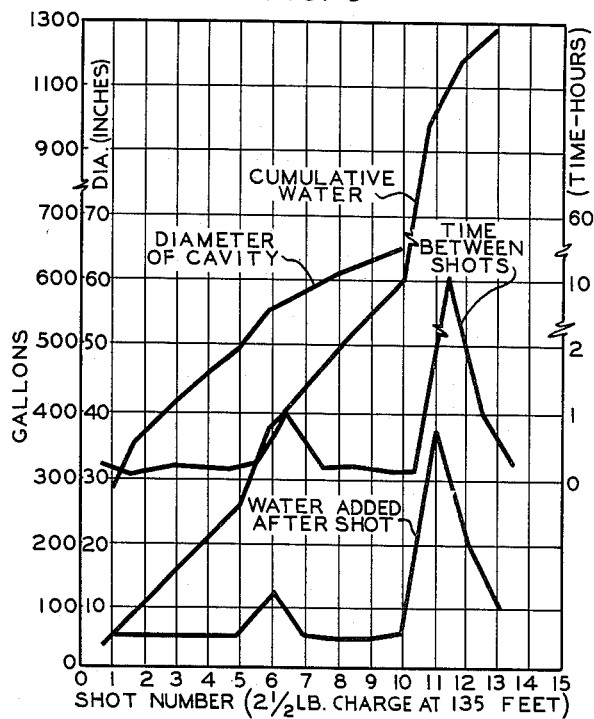

Feb. 21, 1956

R. B. RICE ET AL 2,735,503

METHOD OF SEISMIC PROSPECTING

Filed Nov. 28, 1952

VARIATION IN CHARGE AT 150 FT.

VARIATION IN INITIAL CHARGE SIZE AT 147 FT.

VARIATION IN INITIAL CHARGE SIZE AT 140 TO 150 FT.

INVENTOR.
R. B. Rice and
S. D. Elliott
BY
Hudson and Young
ATTORNEYS

United States Patent Office 2,735,503
Patented Feb. 21, 1956

2,735,503

METHOD OF SEISMIC PROSPECTING

Robert B. Rice and Sam D. Elliott, Bartlesville, Okla., assignors to Phillips Petroleum Company, a corporation of Delaware Application November 28, 1952, Serial No. 322,956

11 Claims. (Cl. 181—.5)

In one aspect this invention relates to seismic prospecting of the type in which seismic waves are created at a shot point, and the travel times of the waves and their reflections are measured at points at or near the earth's surface spaced from the shot point. In another of its aspects the invention pertains to a method for producing seismic waves in regions characterized by the existence of a thick unconsolidated or weathered layer, and in particular a thick unconsolidated layer having one or more loose sand zones therein.

Normally in seismic prospecting, shot holes are drilled through the weathered or unconsolidated layer and into the hard rock formation below, or to a point below the ground water level. One of the principal reasons for doing this is to increase that proportion of energy from the shot which is transferred to the surrounding medium in the form of elastic waves and to eliminate the attenuation of the seismic waves in traveling downward through the unconsolidated layer. In regions where an unusually thick unconsolidated layer exists, the water table is generally quite deep. In such areas the cost of drilling and casing deep shot holes to the water table is high and in some cases so high as to be prohibitive. Furthermore, even when shots are fired below the unconsolidated layer or the water table in such areas, there are a great many unwanted surface and near-surface waves generated which interfere with reflections and the reflections passing upward through the thick unconsolidated layer are highly attenuated because they must pass through such a large amount of material which absorbs and scatters a great deal of the energy. Hence, in order to obtain usable seismograms in these regions, a shooting procedure must be found which will produce the maximum amount of downgoing reflection energy in relation to the amount of unwanted surface and near-surface energy generated. One such region is the Texas Panhandle area comprising Gray and Roberts Counties, Texas. In this area the unconsolidated surface layer varies in thickness from 300 feet to 850 feet with the water bearing sand being at the 350 to 500 foot level. At one location in this area, for example, there were: about 6 feet of soil mantle; layers of caliche and sandy clay from the 6 to 40 foot level; clay and unconsolidated shale containing sand, from the 40 to the 100 foot level; from the 100 to the 300 foot level, alternating layers of unconsolidated loose sand and shales; from the 300 to the 500 foot level, soft sandy shale and some caliche; and water-bearing sand at the 500 foot level. It is readily apparent that in such areas it is highly impractical and undesirable to drill shot holes to the 500 foot level. Moreover, because of the high attenuation characteristics of the unconsolidated weathered layer and the high level of unwanted energy, known seismic methods have not been effective. As a consequence such regions are virtually unexplored.

In accordance with this invention, however, a method is provided for obtaining seismic data in regions where the existence of an unconsolidated layer renders difficult the obtaining of such data because of high attenuation characteristics of said unconsolidated layer, because of the high level of unwanted energy and because the drilling of a shot hole to a water table in the base of said unconsolidated layer is rendered impractical by the depth of said water table.

According to an embodiment of this invention the shot point is located in one of the loose sand zones in the unconsolidated layer and a small spherical cavity is formed in the loose sand zone. This cavity is then sprung without shattering the walls, thereby compressing the walls of said spherical cavity preferably to a maximum diameter. It is our discovery that if a charge of explosive material is then placed in this enlarged spherical cavity and detonated to produce seismic waves, a maximum amount of down-going energy is obtained making it possible to obtain distinctive records in regions having thick unconsolidated layers. Although the invention is particularly applicable to seismic surveying in regions where there is an unusually thick or deep unconsolidated or low velocity layer, the invention can, of course, be used in any unconsolidated layer having a loose sand zone therein. One advantage of operating by the teachings of this invention is that since shallow shot holes above the water table can be used, these can be drilled conveniently by means of air drills. In addition by means of an air drill the loose sand zone can be more easily detected than when other drills are used. An air drill here is used to describe any rotary or other drill in which air under pressure is used to move the drill cuttings from the bottom of the hole to the surface.

Further, in accordance with the present invention as many shallow holes to the loose sand zone can be drilled as are needed to obtain the quality of records wanted. In fact, in one embodiment, this invention provides a means for determining whether it is more economical to employ a multiple hole system or to use a larger charge.

The invention, and objects and advantages thereof, will be more readily understood by reference to the following detailed description taken in conjunction with the accompanying drawings in which:

Figures 1, 2, and 3 illustrate the steps in the formation of a spherical cavity according to the method of this invention.

Figure 4 is a graphic representation showing, at a good location, the relationship of wave amplitude to the number of charges in a weathered or unconsolidated layer.

Figure 5 is a graph showing the effect of each detonation on the diameter of a spherical cavity.

Figure 6:
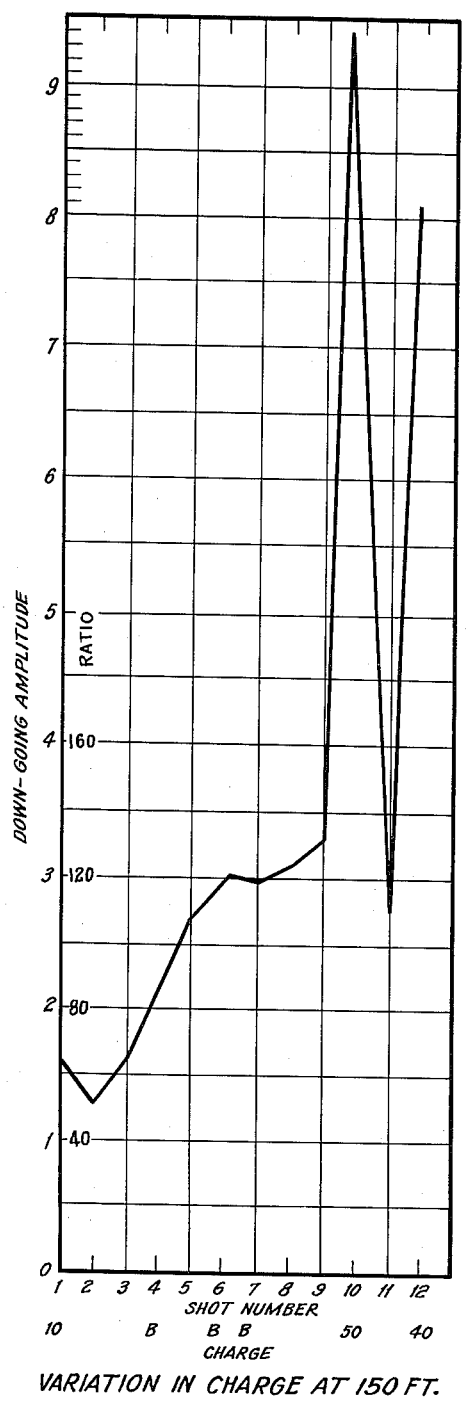
Figure 7:
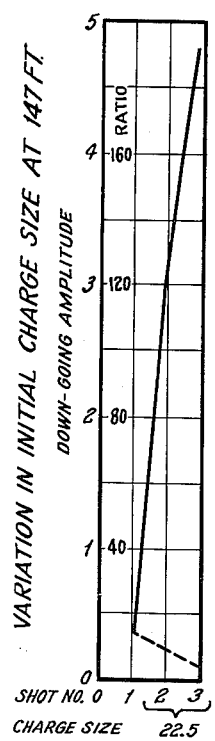
Figure 7A:
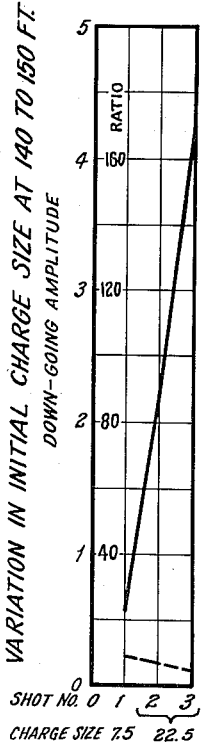

Figures 6, 7, and 7a show the effect of varying the size of charges employed in springing the shot hole.

In practicing our invention, clay, caliche, sand and clay, loose sand, and other caliche zones were encountered at various depths in the course of drilling. In order to measure the amount of downgoing energy from the various shots, down-the-hole seismometers were planted in the Red Bed below the unconsolidated layer at two locations. At a relatively good location where fair reflections had been obtained previously by known methods (i. e. by exploding charges below the water table) the seismometer was planted at a depth of 640 feet. At a poor location where no usable records had been secured, and wherein there were 200 more feet of unconsolidated layer, the seismometer was planted at a depth of 840 feet. Since the Red Bed is a competent consolidated bed lying below the unconsolidated layer, it can be safely assumed that the down-going energy would be reduced very little more by absorption in traveling from the seismometer down to the reflection horizon, and thus the seismometer planted in the Red Bed can be used to measure the relative effectiveness of various shots in generating reflection energy. It is understood, of course, that one following the teachings of this invention need use only surface or near surface seismometers, the seismometers having been located in the consolidated layer at these depths only for the purpose of making the studies resulting in this invention. In making these studies measurement of the amount of unwanted energy traveling to the surface was also made by means of an up-hole seismometer and three-directional seismometers spread along the surface from 440 to 715 feet from the shot hole. Except for a test described later, the charge was tamped with water to a level in the shot hole thirty feet from the surface. The level of the water was kept constant so the size of the spherical cavity could be determined. Normally only sufficient water to fill the cavity and not the entire shot hole need be used.

Figure 1:
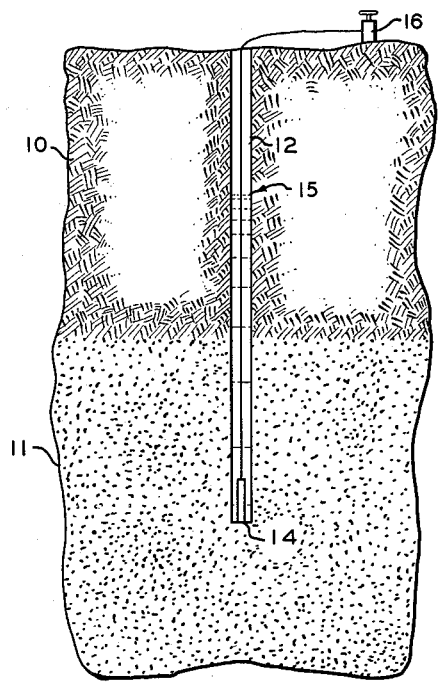

Figure 1 illustrates an unconsolidated layer, that is, an uncemented but compact layer of earth 10 overlying a less compact sand layer 11. A bore hole 12 is drilled into the loose sand layer 11. An explosive charge 14 is then lowered into the bottom of hole 12, the charge tamped with water, the level of which is indicated at 15, and the charge detonated in the usual manner by means of the firing mechanism 16.

Figure 2:
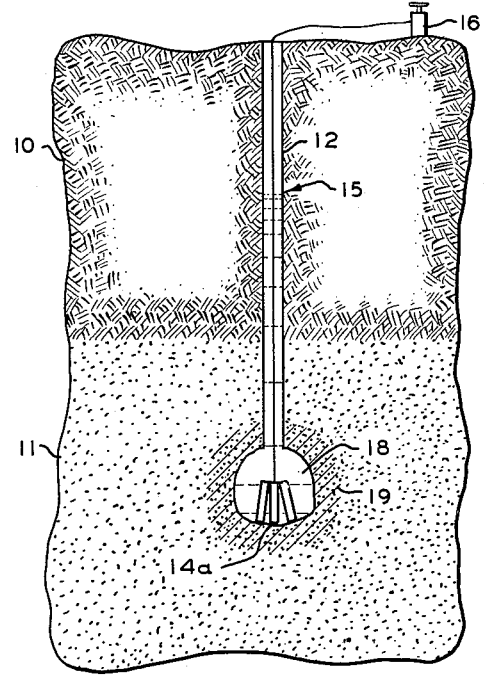

Figure 2 shows the base of bore hole 12 as it might look after the charge 14 in Figure 1 has been detonated. A generally spherical cavity 18 has been sprung at the base of the shaft, the surrounding sand being compressed into a compact ring 19. This cavity is of sufficient size to hold a larger charge 14a.

Figure 3:
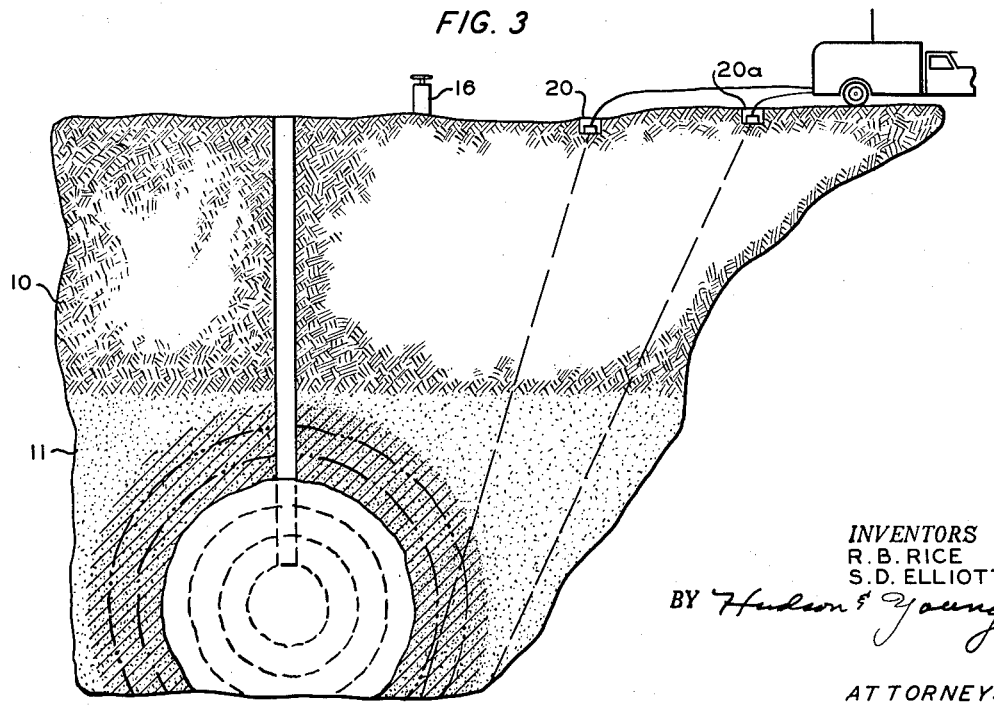

Figure 3 illustrates the pattern of the cavity and the surrounding sand after a series of shots have been detonated at the base of shaft 14; it also illustrates seismic detectors 20, 20a arranged in known manner.

In accordance with one aspect of the present invention, it has been discovered that in regions where it is not desired to drill to a zone below the unconsolidated layer maximum down-going energy can be obtained by shooting in the loose sand zone. Figure 4 illustrates the results of one of a series of tests at the better shooting locations. For each depth tested, the maximum amplitude of the down-going wavelet multiplied by the distance between the shot and the down-hole seismometer, and also the ratio of (1) the maximum amplitude of the up-hole wavelet times shooting depth to (2) the amplitude of the down-hole wavelet times distance traveled, was plotted versus the number of the charge at the given depth. The solid line represents the amplitude of down-going wavelet times the distance between the shot and the down-hole seismometer, while the broken line represents the ratio of (1) to (2). It is necessary in each case to multiply the amplitude of the wavelet by the distance traveled in order to eliminate the geometric effect of the amplitude dying off as the inverse of the distance. Note that the amount of down-going energy continues to increase for as many as 13 two and one-half pound charges at the same depth, remembering that energy is proportional to the square of the amplitude. The most down-going energy is obtained by shooting in the loose sand section, which occurs at a depth of 127–144 ft. at this location. Furthermore, the ratio of up-going to down-going energy (broken line plot) is less in the loose sand zone than for any other.

In a poor location the maximum amount of down-going energy and the minimum ratio of up-hole to down-hole energy can again be obtained by springing the hole with 8 or more two and one-half pound charges and shooting in the loose-sand section, which occurs at 132 to 150 ft. here.

While by conventional methods one or two charges would be detonated, we have found that the amount of down-going energy continues to increase with the number of detonations, a spherical cavity being sprung. Down-going energy increases until the cavity is sprung to a maximum, after which the increase in said down-going energy is slow. In another embodiment of this invention, therefore, a spherical cavity is sprung to about its maximum diameter, using small charges so that the walls of the cavity are not shattered thereby. The data of Figure 5 show that when the spherical shot hole is sprung to about its maximum diameter with two and one-half pound charges, the resulting cavity has a diameter of about five feet. The use of small charges after the cavity is sprung to its maximum diameter have little effect in further increasing the size of the spherical cavity, or the amount of down-going energy. If too large a charge is used the walls will be shattered. The diameter plotted in Figure 5 for each shot is the diameter determined after the shot, e. g. in Figure 5 the diameter after the eighth shot was about 60 inches. The diameter of the cavity in each instance was determined from the amount of water necessary to fill the cavity. Little or no water loss from leakage or from hole blow occurred. Figure 5 shows the data on the time interval between each shot at the good location, the water added after each shot to keep the water level in the hole at 30 feet, the cumulative water added, and the diameter of the cavity after each shot. The latter quantity was not computed in those cases in which considerable time elapsed between shots during which water leaked out of the hole. The time between shots was plotted between each shot, e. g. in Figure 5 the time between the 11th and 12th shots was over 10 hours. It has been found that letting the shot hole stand overnight or longer with water in it actually improves its condition for obtaining the most down-going energy.

In practicing the present invention one shot hole or a number of shot holes can be used. In one test shots were fired simultaneously in two holes with spacings of 10, 20, 30, 40, 60, and 70 feet respectively. The resulting data showed that the spacing of multiple holes is not important, but generally it is preferable to lay out the multiple holes along the line of profile or in a rectangular pattern, the long dimension of which is in the direction of the line of profile. After the holes were sprung with 9 charges fired in two holes at a time, an additional charge was fired in all four holes simultaneously. The results showed that about twice as much energy was obtained from four holes as from two, and the results for a single shot fired singly in each of two of the holes indicate a single charge produces only one-fourth as much energy as four multiples.

In order to verify the discovery that placing the charge in the center of the cavity and springing a spherical cavity gives more down-going energy than making up the charge into a long stick and creating a long cylindrical cavity, tests were conducted on two fresh 150 foot holes. One was initially sprung with a regular two and one-half pound charge and then shot with two successive twenty-two and one-half pound charges placed in the center in the cavity (Figure 7). The other hole was initially sprung with a series of one-half pound charges (seven and one-half pounds altogether) made up into a stick 10 foot long (Figure 7a). It was then shot with two subsequent twenty-two and one-half pound charges made up into 10 foot long sticks. The results as shown in Figures 7 and 7a indicate the superiority of the spherical cavity.

It will be understood that in springing the hole one is not limited to the use of two and one-half pound charges. However, when shooting larger charges larger diameter powder should be used in order that the overall length of the charges be kept to a minimum, thereby permitting the concentration of the charge at a single point in the hole as nearly as possible. In one test after creating a small cavity with an initial two and one-half pound charge, seven and one-half pound charges were placed in the center of the cavity on the second, third, sixth, seventh and eights shots to spring the hole faster. Two and one-half pound charges were used on the fourth, fifth, ninth and tenth shots for comparison with corresponding shots at sixty feet using only two and one-half pound charges. A more rapid springing is accomplished with the use of two initial two and one-half pound charges, then a five pound charge, and then two subsequent twenty pound charges. Figure 6 shows the effect of using an initial ten pound charge of large diameter powder, which was tamped with only enough water to barely cover the charge (about 5 gallons) for initially springing the hole. Figure 6 also indicates that "B" grade dynamite (used on the fourth, sixth, and seventh charges) is about as effective in springing the hole as regular high-velocity dynamite. This figure also shows the relative amount of energy obtained from a 50 and a 40 pound charge. A study of the data on the larger charges in Figure 6 indicates one important technique, within the scope of this invention, namely that the amplitude of the down-going wavelet increases approximately as the square root of the charge size.

When an initial water-tamped charge was followed by a charge tamped with 16 feet of dry dirt, the expected increase in down-going energy from springing the hole was not obtained—in fact a decrease occurred. However, in another test twenty feet of dry dirt tamping on the initial charge gave the same amount of down-going energy as the initial water-tamped charge in the first test. These data indicate that the amount or kind of tamping on the first charge, when the dynamite stick is close to the walls of the hole, is not critical, but that after the first charge has blown out about a 2 foot cavity, water tamping is necessary for transmitting the most energy from the explosion to the medium surrounding the cavity.

The loose sand zone in the unconsolidated layer, in which shot holes are located in accordance with this invention, occurs at varying depths. However, if shot holes are drilled with an air drill, the loose sand zone can easily be located because in this zone, air compression is lost from air leaking out of the bore hole into the loose sand. The bit will tend to stick since the air will not remove all of the cuttings in the sand zone. Hence, this zone usually marks the limit of depth to which a small air drill can go easily without getting drilling tools stuck.

Thus, in the preferred practice of this invention a spherical shot hole is created in a loose said zone in an unconsolidated region, and sprung to its maximum diameter, say about five feet with a total of five to fifty pounds of dynamite. Of course any of the known gelatinous powder charges can be used. The five to fifty pounds of powder can be broken down into any number of charges greater than one so long as care is taken to concentrate each charge in the cavity. The first charge need only be barely covered with sand or water, but succeeding charges are preferably tamped with enough water to fill the entire cavity. After the walls of the shot hole are compressed to a maximum, any size charge, say up to 100 pounds, can be used in obtaining recordings, final charges being well tamped, preferably with water. The seismic signals thus produced are detected at spaced points at or near the earth's surface separated from each other and from the shot point, and recorded in correlation with time. Since the amount of down-going energy increases approximately as the square-root of the increase in charge size, and since the amount of down-going energy obtained is a linear function of the number of multiple shots, the question of whether to obtain more energy by shooting larger charges per hole or by using more holes is primarily one of economics—the relative costs of dynamite and caps, drilling and casing holes, and hauling water being considered. About half as much down-going energy is obtained at the poor location as at the good one. Hence, except to compensate for the additional absorption loss suffered by the reflections returning to the surface in traversing the extra 200 foot of unconsolidated material at the poor location (840 to 640 foot), shots fired simultaneously under these conditions in two multiple holes at the poor location should give results as good as a single shot at the good location. If one attributes the 2 to 1 difference in down-going energy between the two locations entirely to the extra absorption loss suffered by the down-going wavelet in traversing the extra 200 feet down to the down-the-hole geophone, then it would take four multiple shot holes at the poor location for every one needed at the good location, since the returning reflections would suffer the same additional 2 to 1 loss.

Other modifications and variations will, of course, occur to those skilled in the art given the benefit of the teachings of this invention.

We claim:

1. A method of obtaining seismic data in regions in which the existence of an unconsolidated layer renders difficult the obtaining of such data because of the high level of unwanted energy and the high attenuation characteristics of said unconsolidated layer, and because the drilling of a shot hole to a water table in the base of said unconsolidated layer is rendered impractical by the depth of said water table, which comprises initially forming a spherical cavity in a loose sand zone in said unconsolidated layer by the detonation of a small charge in said loose sand zone, springing said cavity by the detonation of successive water-tamped charges of such size that the walls of said cavity are compressed thereby resulting in a spherical cavity having compressed walls, detonating therein an additional explosive charge sufficient to produce seismic waves, simultaneously detecting seismic signals at spaced points at the earth's surface separated from each other and from the shot point and recording said detected waves in correlation with time.

2. A method of obtaining seismic data in regions in which there is an unconsolidated layer having high attenuation characteristics and high unwanted energy level, the thickness of said layer rendering it undesirable to drill shot holes to a depth below said unconsolidated layer, which comprises forming a cavity in a loose sand zone in said unconsolidated layer, springing it to a spherical cavity of maximum diameter with a plurality of shots of such size that the walls are not shattered thereby, detonating therein an additional explosive charge sufficient to produce seismic waves, detecting seismic signals thus produced at spaced points at the earth's surface separated from each other and from the shot point and recording said detected waves in correlation with time.

3. A method of obtaining seismic data in regions in which the existence of an unconsolidated layer renders difficult the obtaining of such data because of the high unwanted energy level and the high attenuation characteristics of said unconsolidated layer and because the drilling of a shot hole to a water table in the base of said unconsolidated layer is rendered impractical by the depth of said water table, which comprises initially forming a spherical cavity in a loose sand zone in said unconsolidated layer by the detonation of a small charge in said loose sand zone, springing said cavity by the detonation of successive water-tamped charges of such size that the walls of said cavity are compressed to a maximum thereby resulting in a spherical cavity of maximum diameter, detonating therein an additional explosive charge sufficient to produce seismic waves, simultaneously detecting seismic signals at spaced points at the earth's surface separated from each other and from the shot point and recording said detected waves in correlation with time.

4. A method of seismic surveying over an area of the earth's surface in which the existence of an unconsolidated layer renders difficult the obtaining of seismic data because of the high level of unwanted energy and the high attenuation characteristics of said unconsolidated layer and because the drilling of a shot hole to a water table in the base of said unconsolidated layer is rendered impractical by the depth of said water table which comprises initially forming a spherical cavity in a loose sand zone in said unconsolidated layer by the detonation of a small charge in said loose sand zone, springing said cavity by the detonation of successive water-tamped charges of such size that the walls of said cavity are compressed to a maximum thereby resulting in a spherical cavity of maximum diameter, detonating therein an additional explosive charge of from 2½ to 100 pounds to produce seismic waves, simultaneously detecting seismic signals at spaced points at the earth's surface separated from each other and from the shot point and recording said detected waves in correlation with time.

5. A method of seismic surveying over an area of the earth's surface in which there is a low velocity unconsolidated layer which renders impractical drilling shot holes to a point below said unconsolidated layer because of the depth of the base of said layer which comprises detonating in a loose sand zone in said unconsolidated layer a small charge not exceeding five pounds, thereby forming a spherical cavity, sequentially detonating a plurality of charges in said cavity, the cavity being tamped with water in each case and the total charge not exceeding fifty pounds, thereby producing a spherical cavity having a diameter of about five feet, detonating therein an additional charge sufficient to produce seismic waves, simultaneously detecting seismic signals at spaced points separated from each other and from the shot point and recording said detected waves in correlation with time.

6. A method of producing seismic waves in an unconsolidated layer having a loose sand zone therein which comprises initially forming a spherical cavity in a loose sand zone in said unconsolidated layer by the detonation of a small charge in said loose sand zone, springing said cavity by the detonation of successive water-tamped charges of such size that the walls of said cavity are compressed to a maximum thereby resulting in a spherical cavity of maximum diameter, and detonating therein an additional explosive charge sufficient to produce seismic waves.

7. A method of producing seismic waves in an unconsolidated layer having a loose sand zone therein which comprises detonating in a loose sand zone in said unconsolidated layer a small charge not exceeding five pounds thereby forming a spherical cavity, sequentially detonating a plurality of charges in said cavity, the cavity being tamped with water in each case and the total charge not exceeding fifty pounds, thereby producing a spherical cavity having a diameter of about five feet, and then detonating therein a larger charge sufficient to produce seismic waves.

8. A method of producing seismic waves in a low velocity unconsolidated layer so thick as to render it undesirable to drill below it which comprises forming a plurality of spherical cavities by the detonation of small charges in a sand zone in said unconsolidated layer, springing each cavity by the detonation of successive water-tamped charges of such size that the walls of the cavities are compressed to a maximum thereby resulting in a plurality of spherical cavities of maximum diameter, introducing an additional charge into each cavity sufficient to produce seismic waves, and simultaneously detonating said additional charges to produce seismic waves.

9. A method of producing seismic waves in an unconsolidated layer having a loose sand zone therein which comprises drilling a shot hole to a loose sand zone in said unconsolidated layer, introducing a two and one-half pound explosive charge in said shot hole, detonating said charge to form a small spherical cavity in said loose sand zone, sequentially introducing into said cavity a plurality of explosive charges, the total charge not exceeding fifty pounds, tamping said cavity each time with water, permitting water to remain in said cavity at least once for at least six hours, and detonating said explosive charges in sequence to spring said cavity to a spherical cavity having a diameter of about five feet.

10. A method of producing seismic waves in an unconsolidated layer having a loose sand zone therein which comprises drilling a shot hole to a loose sand zone in said unconsolidated layer, introducing a two and one-half pound explosive charge in said shot hole, detonating said charge to form a small spherical cavity in said loose sand zone, sequentially introducing into said cavity a plurality of explosive charges, the total charge not exceeding fifty pounds and large diameter powder being used if large charges are employed, tamping said cavity each time with water, and detonating said explosive charges in sequence to spring said cavity to a spherical cavity having a diameter of about five feet, and then detonating therein a large charge sufficient to produce seismic waves.

11. A method of producing seismic waves in an unconsolidated layer having a loose sand zone therein which comprises drilling a plurality of shot holes at a predetermined location to a loose sand zone, down-going energy increasing linearly with the number of shot holes used, introducing a two and one-half pound explosive charge in each shot hole, detonating each charge to form a plurality of small spherical cavities in said loose sand zone, sequentially introducing into each cavity a plurality of explosive charges, tamping each cavity each time with water, and detonating said explosive charges in sequence in each cavity to spring each cavity to a spherical cavity having a diameter of about five feet, the total charge used to spring each cavity not exceeding fifty pounds and large diameter powder being used if large charges are employed, thereafter introducing into each cavity a large charge sufficient to produce seismic waves, the amount of down-going energy increasing as the square-root of the increase in charge size, and simultaneously detonating the last-mentioned charges to produce seismic waves.

References Cited in the file of this patent

UNITED STATES PATENTS

| | | |
|---|---|---|
| 2,049,236 | Weatherby | July 28, 1936 |
| 2,073,493 | Salvatori | Mar. 9, 1937 |
| 2,630,188 | Hawkins et al. | Mar. 3, 1953 |

FOREIGN PATENTS

| | | |
|---|---|---|
| 701,747 | France | Mar. 21, 1931 |